(12) United States Patent
Finkelstein et al.

(10) Patent No.: US 6,176,776 B1
(45) Date of Patent: Jan. 23, 2001

(54) PRESSURE RELIEF PORT

(75) Inventors: Burl Finkelstein; Brett A. Mitchell, both of Newnan, GA (US)

(73) Assignee: Kason Industries, Inc., Shenandoah, GA (US)

( * ) Notice: Under 35 U.S.C. 154(b), the term of this patent shall be extended for 0 days.

(21) Appl. No.: 09/335,364

(22) Filed: Jun. 17, 1999

(51) Int. Cl.[7] ................................................ F24F 13/18
(52) U.S. Cl. .............................................. 454/195; 62/410
(58) Field of Search ............................ 137/512; 62/409, 62/410; 454/195, 274, 277

(56) References Cited

U.S. PATENT DOCUMENTS 3,813,896 * 6/1974 Lebahn ................................. 454/195
5,421,775 * 6/1995 Honda ................................. 454/195

* cited by examiner

Primary Examiner—Harold Joyce
(74) Attorney, Agent, or Firm—Kennedy, Davis & Hodge, LLP

(57) ABSTRACT

A pressure relief port has a tubular housing 11 in which a hollow valve body 12 is mounted. An upper poppet valve 23 is operatively mounted to the top of the valve body and a lower poppet valve 25 is operatively mounted to the bottom of the valve body. The interior of the valve body communicates with one end of the tubular housing through the upper poppet valve while the exterior communicates with the other end of the tubular housing through the lower poppet valve.

6 Claims, 2 Drawing Sheets

PRESSURE RELIEF PORT

TECHNICAL FIELD

This invention relates to pressure relief ports and vents used on temperature controlled enclosures such as walk-in freezers and test chambers.

BACKGROUND OF THE INVENTION

Many commercial enclosed spaces need to be equipped with pressure relief ports which are sometimes referred to as ventilator ports. This is particularly true where the sealed space is subjected to temperature related gas volume variations that must be relieved.

Many of these enclosed spaces require that a positive air pressure differential to ambience be maintained. For example, clean rooms often require this as do paint spray booths to prevent entry of ambient dust. As exemplified in U.S. Pat. No. 5,820,456, they typically maintain a positive differential by control of intake and exhaust fan speeds. However there are spaces where no differential is required or desired. Passive ports are suitable for these. However existing passive pressure relief ports, meaning those without fans or blowers, have often permitted air migration where there is no significant pressure differential. With walk-in freezers this causes undesirable condensation and frosting. Frosting is a substantial problem that occurs as ambient warm air drawn into a low temperature chamber releases significant amounts of moisture relative to the change in dew point of the air at high and low temperatures. Air is drawn through the port after each door opening cycle as the warm air that entered cools and contracts. If venting does not occur, a partial vacuum results which make it difficult to reopen the door. In extreme cases, the enclosures can even collapse.

A temperature rise in the enclosure between cooling cycles, and especially during a defrost cycle, creates a need to vent air to prevent pressure buildup. Again, failure to vent this pressure, with adequate relief capacity, can cause the chamber to rupture.

Passive pressure relief ports are in wide commercial use today. However, they have a number of limitations and disadvantages. Many have in line valves located within housings that extend through walls. Their space requirements dictate that they be larger than the wall thickness and thus protrude from one or both sides of the wall. Where they extend into a freezer, it is difficult to prevent ice from forming, even with internal heaters. Their valves are often spring loaded and thus over time lose sensitivity. This results in leaky valves that permit air and moisture migration and seepage, which can cause frosting and icing.

Accordingly, it is seen that a need exists for a passive pressure relief port, i.e. one that is not electrically powered by fans and baffles, which can relieve both positive and negative pressure differentials, yet which substantially prevents air migration under static differential conditions. A need also exists for such a pressure relief port which has high flow capacity and yet which is of such small and economic construction that it can be readily mounted in a door jamb or wall. Again, being mountable in a door jamb is desirable so that it may have a heater, to prevent internal ice formation, that can be easily wired to a light switch box that normally is located near door jambs. It thus is to be provision of such a pressure relief port that the present invention is primarily directed.

SUMMARY OF THE INVENTION

In a preferred form of the invention a pressure relief port comprises a tubular housing adopted to be mounted in a wall or door jamb of an enclosure such as a walk-in freezer to provide air flow communication through the wall under air pressure differential conditions. A tubular valve body is mounted within the housing that has a top formed with a top valve opening and a bottom formed with a bottom valve opening. An upper poppet valve is risibly supported upon the valve body top over the top valve opening. A lower poppet valve is risible supported upon the valve body over the bottom valve opening. The inside of one end of the tubular valve body to one side of the upper and lower poppet valves is closed. The outside of the opposite end of the tubular valve body is sealed to the tubular housing. With this construction air may flow through the port in one direction by entering the valve body through the lower poppet valve opening and through the port in the other direction by exiting the valve body through the upper poppet valve opening.

DETAILED DESCRIPTION

Figure 1:
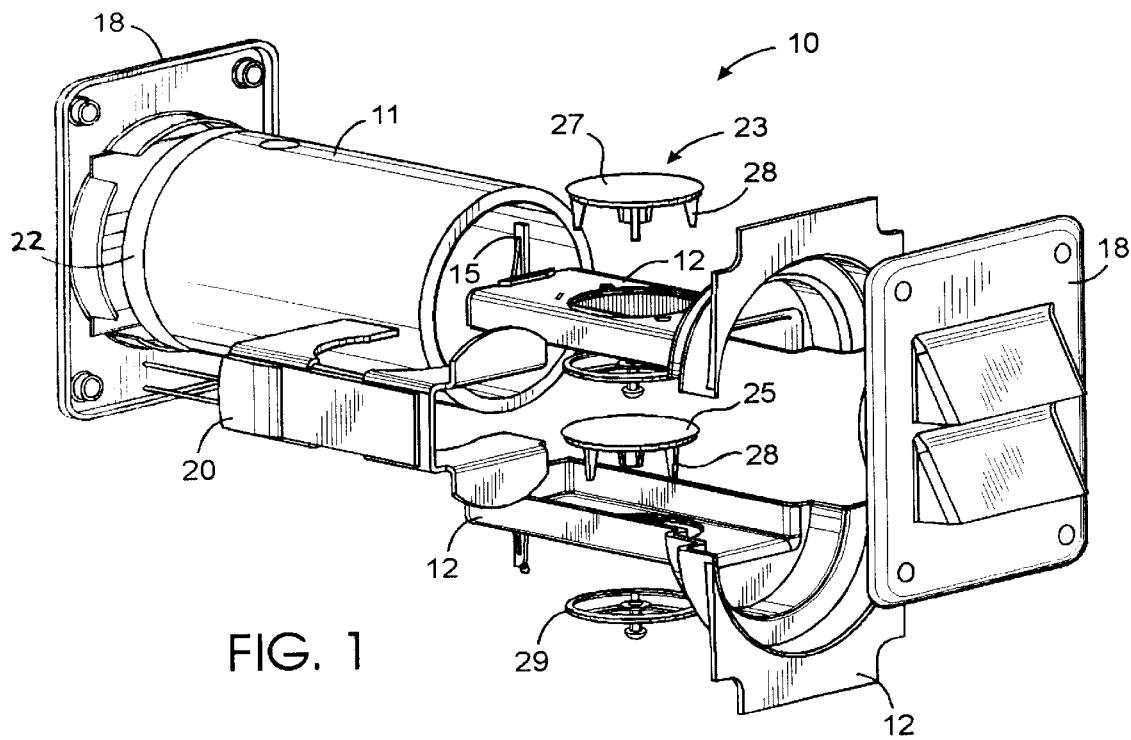
FIG. 1 is an exploded view, in perspective, of a pressure relief port that embodies principles of the invention in its preferred form.
Figure 2:
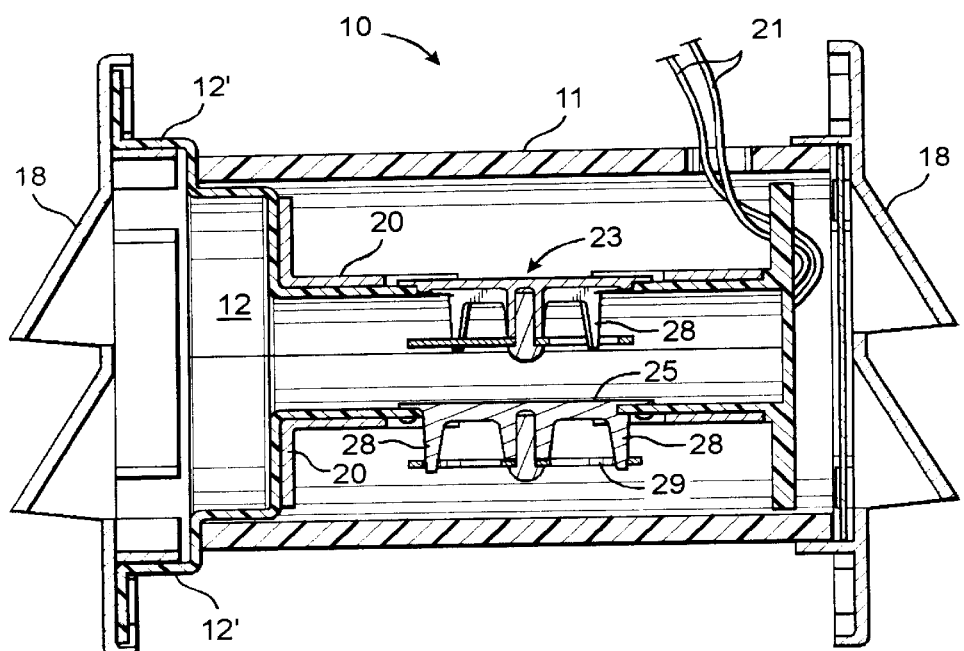
FIG. 2 is a cross sectional view of the pressure relief port shown in FIG. 1 shown assembled with both poppet valves closed.
Figure 3:
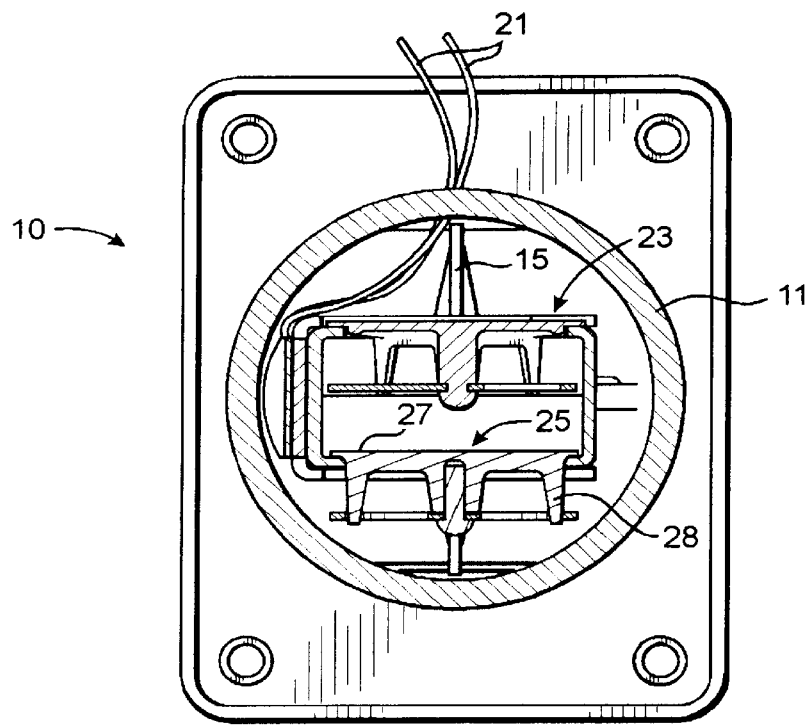
FIG. 3 is an end view of the port without louvers.
Figure 4:
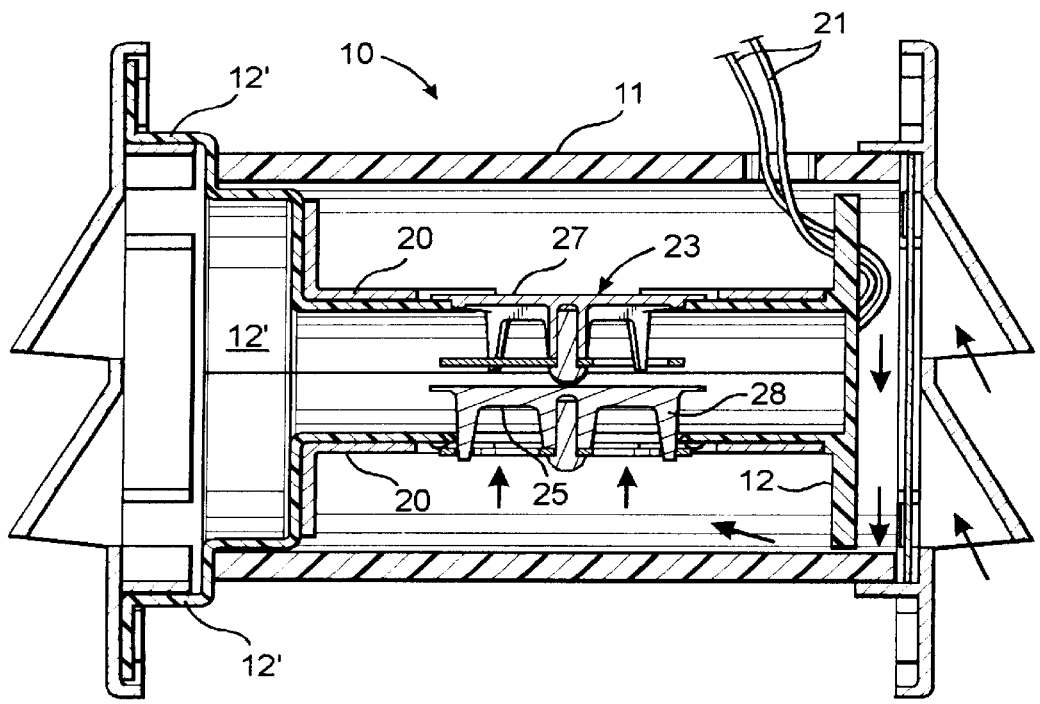
FIG. 4 is a cross sectional view of the pressure relief port with one poppet valve shown open.

With reference in more detail to the drawing, there is shown a pressure relief port 10 that has a housing 11 which can be a length of standard two inch PVC plastic pipe that serves as a through wall or door jamb conduit. This has the advantage of being able to accommodate walls of different thicknesses by merely cutting a pipe a length to suit. A valve body 12 is mounted within the housing 10 which has a stepped flange 12'. The valve body is of a two piece construction with the pieces being held together by clips 15. As best shown in FIGS. 2 and 4 the outside of the end of the valve body 12 that has the stepped flange is sealed to the pipe housing 11. Conversely, the opposite end has an air gap between it and the housing. Two louvers 18 are mounted to the ends of the housing. A heater 20 is mounted over three sides of the valve body 12. The heater has unshown resistance elements that may be energized by power lines 21. A screen 22 is also provided at one end of the housing to prevent entry of bugs.

The pressure relief port has two poppet valves, namely an upper poppet valve 23 and a lower poppet valve 25. Each poppet valve has a disc 27 from which legs 28 depend that support a retainer wheel 29. The top poppet valve sits on the top of the valve body 12 over a top valve hole while the bottom poppet valve sits on the bottom of the valve body over a bottom valve hole. The poppet valve discs close these valve holes by gravity when they are at rest with their retainer wheels providing extra weight that prevents cocking and which also provide stops to limit the rise height of the discs over the valve openings. This unique design permits the valve body to be assembled from two of the same molded parts. The louvers and poppet valves are also duplicates. With the poppet valves stacked one above the other, a compact design is achieved which permits the port to be installed in relatively thin walls with only small protrusions.

Once installed the pressure relief port is closed when there is no differential in air pressure at its opposite ends. This is the condition shown in FIG. 2. Here the poppet valve discs are shown closing both the top and bottom valve holes in the valve body. Again, the weight of the retainer wheels with attached heavy studs insures the maintenance of good seals to prevent air migration. Should pressure build on the outside, as shown in FIG. 4, it will also build about the valve body and cause the lower poppet valve 25 to lift off the bottom valve hole. At the same time it will exert further valve closing force on the upper poppet valve. The lower valve retainer wheel will contact the valve body floor just before it rises sufficiently to engage and raise the upper poppet valve. Air may now flow as shown by the arrows through the bottom valve hole and the valve body to the interior of the enclosure, the left side in FIG. 4, until air pressure equilibrium is reached. In the opposite case where inside pressure becomes elevated above ambient pressure, the air pressure will build inside the valve body and cause the upper poppet valve to rise while simultaneously exerting additional closing force on the lower poppet valve. When equilibrium is reached the upper poppet valve will gravitate back to a position closing the upper valve hole. Of course the orientation of the entire port may be reversed, if desired.

It thus is seen that a pressure relief port is now provided of a compact, spaced efficient and cost efficient construction. The port relieves both positive and negative pressure differentials and yet remains securely closed during air pressure equilibrium conditions. It is readily wirable for heating and has louvers that are often required by regulatory agencies. Though it has been described in detail in its preferred form, it should be realized that many modifications, additions and deletions may be made without departure from the spirit and scope of the invention as set forth in the following claims.

What is claimed is:

1. A pressure relief port comprising a tubular housing adapted to be mounted in a wall a walk-in freezer to provide air flow communication through the wall, a tubular valve body mounted within said housing and having a top formed with a top valve opening and a bottom formed with a bottom valve opening, a upper poppet valve risible supported upon said valve body top over said valve top opening, a lower poppet valve risible supported upon said valve body bottom valve opening, and wherein the inside one end of tubular valve body to one side of said upper and lower poppet valves is closed and wherein the outside of the opposite end of said tubular valve body is sealed to said tubular housing.

2. The pressure relief port of claim 1 wherein said upper poppet valve is positioned over the lower poppet valve whereby the poppet valves are stacked.

3. The pressure relief port of claim 1 further comprises louvers mounted to each end of said tubular housing.

4. A pressure relief port comprising a tubular housing, a hollow valve body mounted within said tubular housing that has an upper wall upon which an upper poppet valve is liftably supported and a lower wall upon which a lower poppet valve is supported, and wherein the outside of said hollow valve body to one side of said upper and lower poppet valves is sealed to said tubular housing and the inside of said hollow valve body to the other side of said upper and lower poppet valves is closed.

5. The pressure relief port of claim 4 wherein said upper and lower poppet valves are supported on said valve body in a stack.

6. A pressure relief port comprising a tubular housing, a hollow valve body having a top and bottom mounted within said housing with the interior of said valve body being in fluid communication with only one end of said tubular housing and with the exterior of said valve body being in fluid communication with only the opposite end of said tubular housing, an upper poppet valve operatively mounted to said valve body top and a bottom poppet valve operatively mounted to said valve body bottom.

* * * * *